B. W. FJELLMAN.
THRUST BALL BEARING.
APPLICATION FILED OCT. 17, 1914.
1,144,115.
Patented June 22, 1915.
3 SHEETS—SHEET 1.
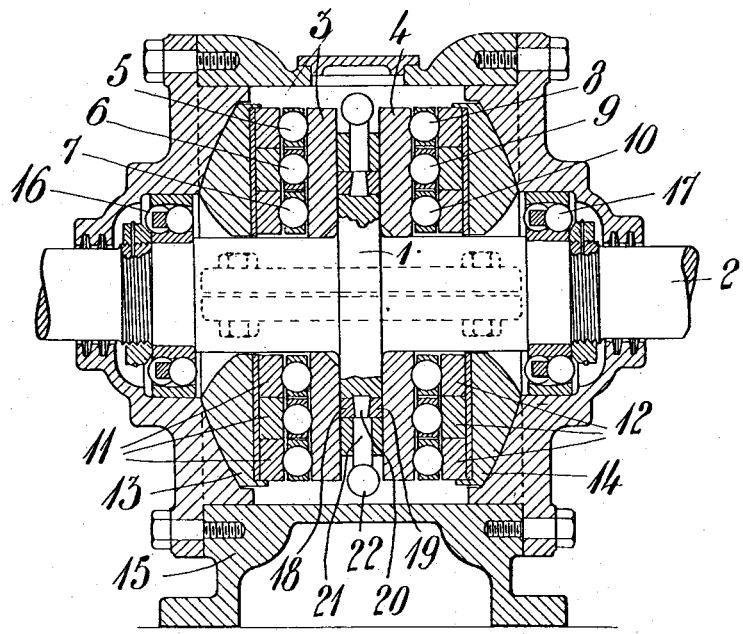
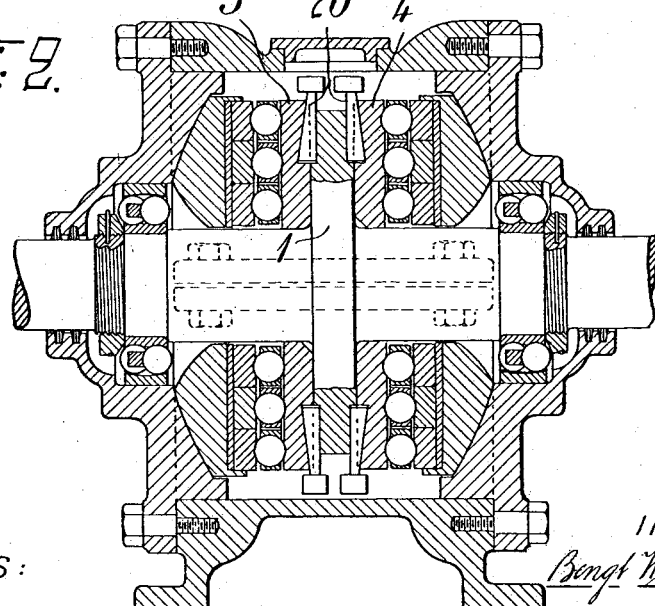
WITNESSES:
J. J. Wallace
René Bruine
INVENTOR:
Bengt Wiktor Fjellman
By Attorneys,
Fraser, Tinth & Myers

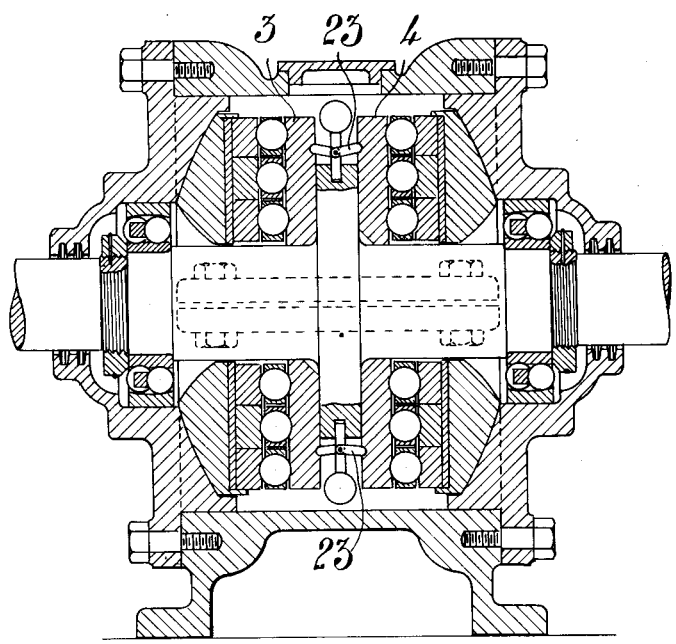
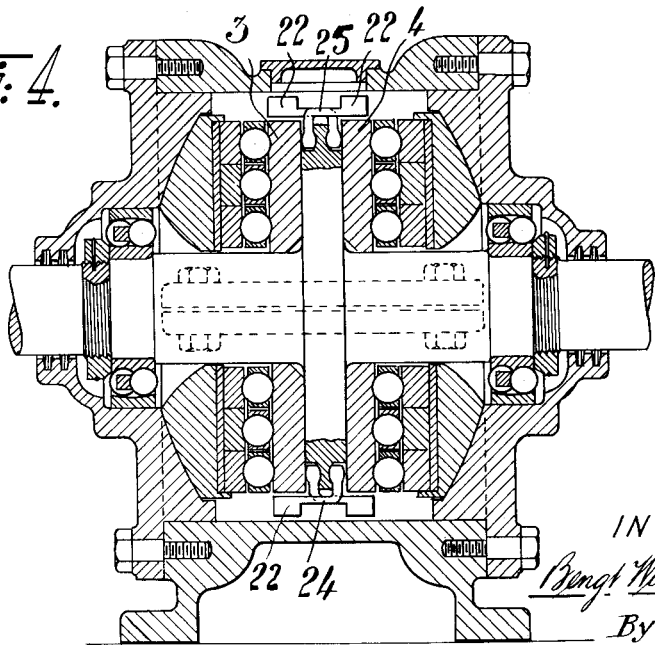

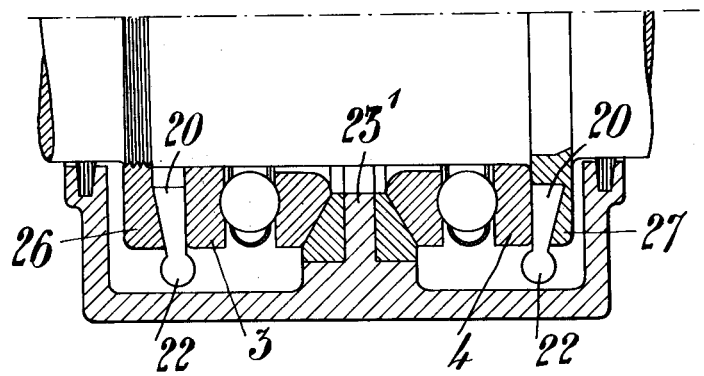
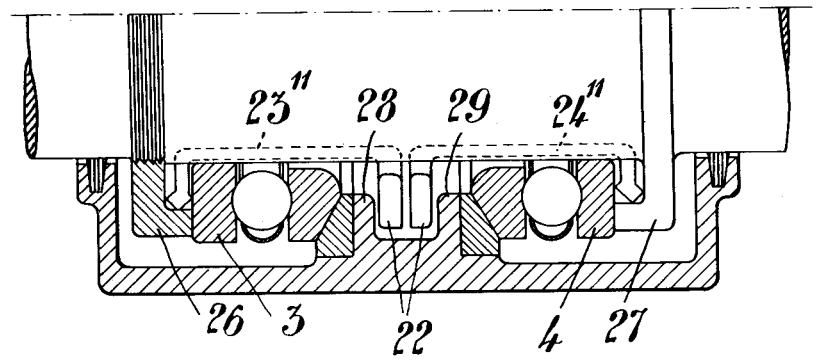

UNITED STATES PATENT OFFICE.

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

THRUST BALL-BEARING.

1,144,115.   Specification of Letters Patent.   Patented June 22, 1915.

Application filed October 17, 1914. Serial No. 867,085.

*To all whom it may concern:*

Be it known that I, BENGT WIKTOR FJELLMAN, a citizen of the Kingdom of Sweden, residing at Gottenborg, Sweden, have invented new and useful Improvements in Thrust Ball-Bearings, of which the following is a specification.

This invention relates to thrust ball bearings and more especially to double acting thrust ball bearings. Ball bearings of this kind having two series of balls each of which is active in one direction of pressure suffer, especially when used for horizontal or inclined shafts, from the inconvenience that, on account of the high compression of the one half of the bearing, a certain play arises in the other half thereof momentarily unloaded. On account thereof the balls and bearing rings of the unloaded half of the bearing are liable to be displaced from their proper positions, owing to their own weight and the centrifugal forces arising during the rotation. When the direction of load then changes, the balls will be exposed to jamming, easily resulting in hot running and rapid wear of the different parts of the bearing. The same inconvenience can arise also when a bearing originally constructed without play becomes worn.

The object of the invention is to obviate the said inconveniences by providing in a ball bearing of the kind in question a device effecting automatically, during the rotation, an axial load on the half of the bearing which momentarily is not exposed to the axial load acting through the shaft, and with this object in view the invention consists, chiefly, in this that, in order to compress the half of the bearing which momentarily is unloaded, the said half is kept compressed by means of forces effected by one or more centrifugal weights provided in the bearing. This and other objects may be attained by means of the constructions illustrated in the accompanying drawings showing sectional views of double acting thrust ball bearings embodying the invention.

Figure 1 shows a ball bearing provided with wedges which are acted upon by centrifugal weights for compressing the halves of the bearing during the rotation. Fig. 2 is a modified form of the ball bearing shown in Fig. 1. Fig. 3 shows a ball bearing having a toggle joint and Fig. 4 another ball bearing having bell crank levers for compressing the halves of the bearing during the rotation. Fig. 5 illustrates a third ball bearing provided with wedges, and Fig. 6 another ball bearing provided with bell crank levers.

Referring to Fig. 1, the ball bearing shown therein is a double acting propeller shaft bearing of a well known type. The halves of the bearing are located at each side of a flange 1 on the shaft 2, and each of said halves consists of a bearing plate 3 and 4 respectively partaking in the rotation and provided with tracks for the balls, one or more series of balls 5, 6, 7, and 8, 9, 10 respectively preferably placed in a suitable ball cage, one or more stationary bearing rings 11 and 12 respectively having tracks for the balls, and a supporting plate 13 and 14 respectively having a spherical outer surface which bears against a corresponding spherical surface in the casing 15. Radial ball bearings 16 and 17 are inserted at the ends of the casing for supporting the weight of the shaft.

The details of the bearing described above do not form any part of the present invention and may be varied at will in different manners.

When the shaft 2 is exposed to a thrust working in axial direction, for instance from the right to the left, the left half of the bearing will be somewhat compressed owing to the elasticity of the parts of the bearing, while in the right half of the bearing a certain play will arise. In order to obviate the said play or at least to reduce it to an uninjurious amount, the arrangement described below is provided. Inserted in the flange 1 of the shaft are blocks or rings 18 and 19 respectively which are movable axially and the outer surfaces of which bear against the bearing plates 3 and 4 respectively, while the surfaces facing each other are beveled and bear against wedges 20 placed between them. Each of said wedges is by means of a rod 21 connected with a centrifugal weight 22. The number of the centrifugal weights and the corresponding wedges may be chosen at will and suited to the circumstances. When the shaft is rotated, the centrifugal weights tend to pull the wedges outwardly in radial direction thereby causing the blocks or rings 18 and 19 to move apart, so that the half of the bearing being momentarily unloaded will be compressed and the different parts of the bearing thereby prevented from being displaced from their proper positions. When the rotation ceases and the load on the bearing on account thereof is removed, the wedges will be forced back to their original position by the compressive force effected by the normal tightening of the parts of the bearing. If desired, springs may also be used for the same purpose. In order to prevent the wedges from sticking in the position into which they have been pulled out by the centrifugal weights which would cause an unnecessary compression of the bearing, even in case of the shaft being unloaded, the angle of the wedges is to be chosen larger than the angle of friction of the surfaces of the wedges. It is not necessary that the compressive forces effected by the centrifugal weights shall act between the halves of the bearing, as is the case in the bearing shown in Fig. 1, since said forces may act between the shaft or the shaft flange and each half of the bearing. Such a device provided with wedges forming the power transmitting means is shown in Fig. 2. In this case each half of the bearing is provided with a system of wedges and corresponding centrifugal weights, said systems being independent of each other. The wedges 20 act directly between the shaft flange and the bearing plates 3 and 4 respectively. In order to reduce the friction at the working surfaces of the wedges and thereby to attain the possibility of using small angles of wedge, without the risk of the wedges being jammed, balls or rollers may be provided at said surfaces.

Fig. 3 shows a ball bearing in which toggle joints 23 are used for transmitting power from the centrifugal weights to the bearing plates 3 and 4. Said toggle joints may, as is shown in the drawing, be placed directly between the bearing plates 3 and 4 or operate between the shaft flange and either of the plates 3 and 4 in which latter case each half of the bearing obtains an independent compression device. The manner of operation corresponds to that of the bearings shown in Figs. 1 and 2.

In the bearing shown in Fig. 4 bell crank levers 24 and 25 are placed between the shaft flange and each of the bearing plates 3 and 4, the free ends of said levers supporting centrifugal weights 22 which during the rotation tend to turn the levers in such manner that they effect an axial load on both halves of the bearing and thus the desired compression of the half thereof momentarily unloaded.

The invention is not limited to bearings in which both halves of the bearing, as in Figs 1 to 4 are placed at each side of a shaft flange but may advantageously be used also in bearings in which both halves of the bearing are placed between two shaft flanges and one or two stationary flanges or the like in the bearing, as shown in Figs. 5 and 6.

In the ball bearing shown in Fig. 5 both halves of the bearing are placed between a stationary flange $23^1$ in the casing and two shaft flanges 26 and 27 one of which may be integral with the shaft. The compression of the half of the bearing momentarily unloaded is effected by means of wedges 20 provided with centrifugal weights 22 and placed between each of the shaft flanges 26 and 27 and the rotating bearing plates 3 and 4 respectively.

In the ball bearing according to Fig. 6 both halves of the bearing are placed between each of the flanges 28 and 29 in the casing and the shaft flanges 26 and 27 respectively. The compression of the halves of the bearing during the rotation is effected by means of bell crank levers $23^{11}$ and $24^{11}$ provided with centrifugal weights 22, said levers effecting a pressure between each of the shaft flanges 26 and 27 and the rotating bearing rings 3 and 4 respectively.

The invention may also be used in double acting thrust bearings consisting of two single thrust ball bearings, one for each direction of pressure.

Of course, it is desirable that the size of the centrifugal weights be reduced as far as possible. This is rendered possible by the power transmitting devices described above (wedges, toggle joints, bell crank levers or the like) which may without any difficulty be arranged in such manner that they multiply the centrifugal force, which can take place without any inconvenience, since the movements necessary for obtaining the compression of the unloaded half of the bearing amount generally to a fractional part only of a millimeter. It is evident that for the said power transmitting means may be substituted any equivalent device known within the mechanics.

Having thus described my invention, what I claim as new and desire to secure by Letters Patent, is:—

1. In a double acting thrust ball bearing, each half of which is exposed to varying load, the combination of weights adapted to be actuated by centrifugal forces during the rotation, and means transmitting said centrifugal forces as axially acting pressure to the half of the bearing momentarily unloaded, substantially as and for the purpose set forth.

2. In a double acting thrust ball bearing, each half of which is exposed to varying load, the combination of weights adapted to be actuated by centrifugal forces during the rotation, and power transmitting means actuated by said weights and arranged to transmit the said centrifugal forces with increased value to the unloaded half of the bearing, substantially as and for the purpose set forth.

3. In a double acting thrust ball bearing, each half of which is exposed to varying load, the combination of bearing plates rotating with the shaft, weights arranged to be moved by centrifugal forces during the rotation, and means operating between said bearing plates and arranged to transmit movements from said weights to the half of the bearing momentarily unloaded, so as to compress said half, substantially as and for the purpose set forth.

4. In a double acting thrust ball bearing, each half of which is exposed to varying load, the combination of bearing plates rotating with the shaft, a shaft flange, weights arranged to be moved by centrifugal forces during the rotation, and means operating between said shaft flange and each of the said bearing plates and arranged to transmit movements from said weights to the half of the bearing momentarily unloaded, substantially as and for the purpose set forth.

In testimony whereof I have hereunto set my hand in presence of two subscribing witnesses.

BENGT WIKTOR FJELLMAN.

Witnesses:
    AUG. SORENSEN,
    KARL RUNESKOG.